July 18, 1939.   G. H. SCOTT   2,166,267
SUCTION CLEANER HEADLIGHT
Filed Feb. 18, 1935   2 Sheets-Sheet 1
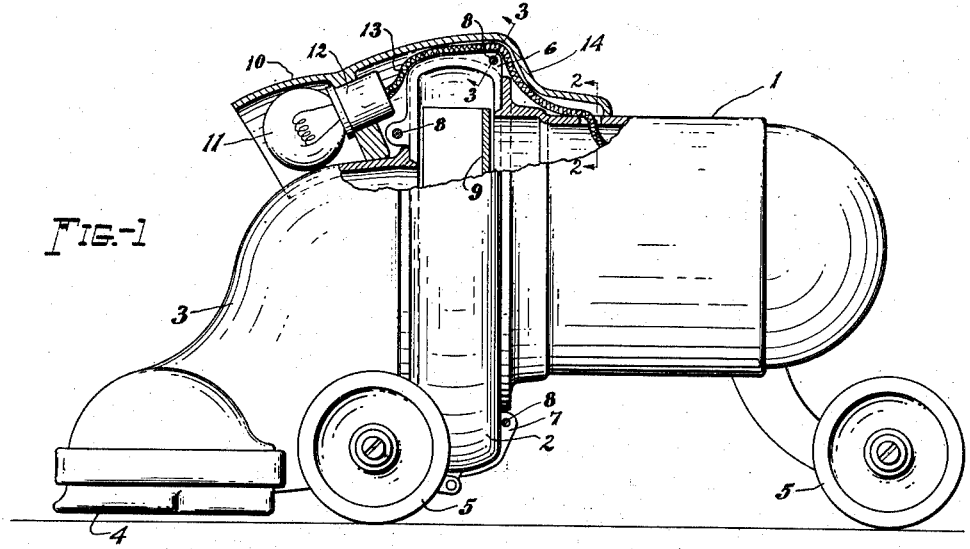
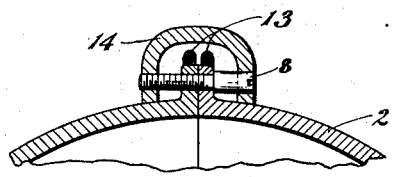
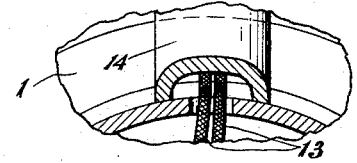
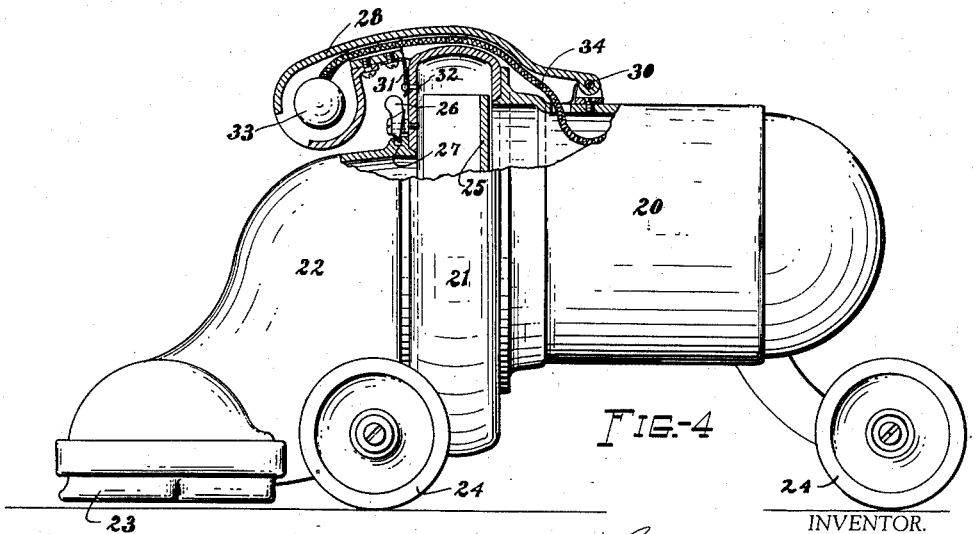
INVENTOR.
George H. Scott
BY Edmund J. Te Pas
his ATTORNEY.

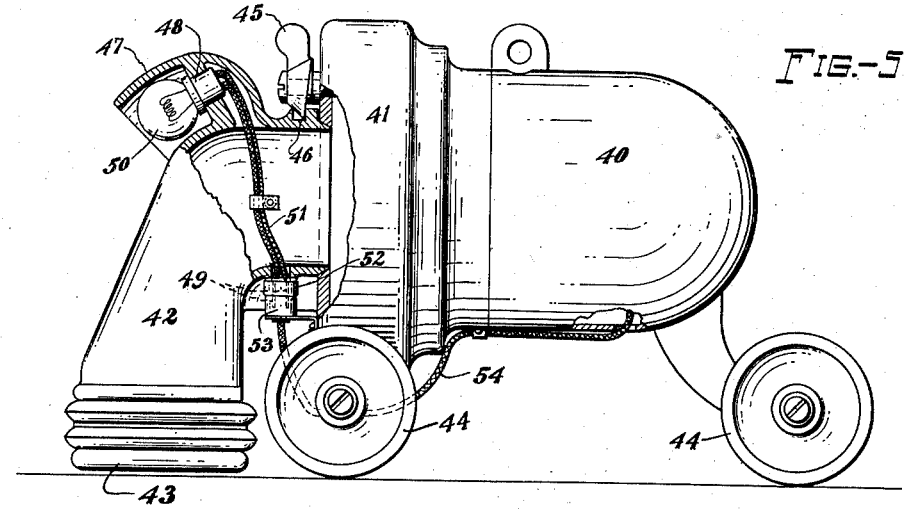
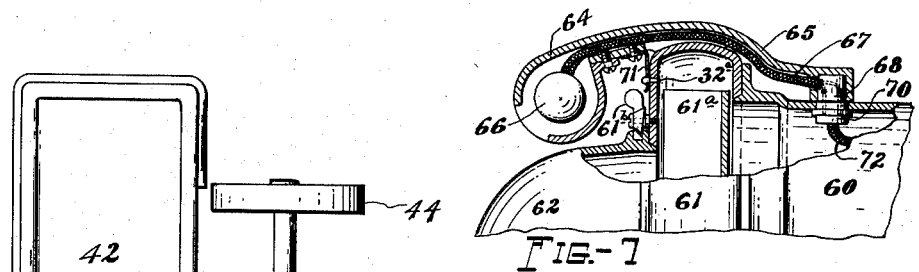
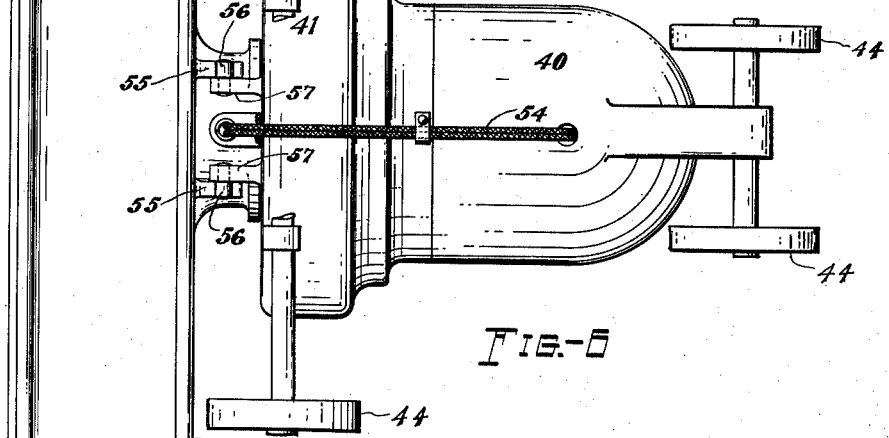

Patented July 18, 1939

2,166,267

UNITED STATES PATENT OFFICE 2,166,267

SUCTION CLEANER HEADLIGHT

George H. Scott, Lakewood, Ohio, assignor to The Scott & Fetzer Company, Cleveland, Ohio, a corporation of Ohio Application February 18, 1935, Serial No. 6,999

2 Claims. (Cl. 240—2)

This invention relates to a suction cleaner headlight adapted for use in connection with suction cleaners employing a horizontally disposed motor, and it has for its objects the provision of a combined support, shade and reflector for the lamp of a vacuum cleaner of the type described, with means for concealing the electric cords leading to the lamp; the provision of a device of the type described which is also used for concealing and maintaining in assembled relation certain of the elements of the cleaner casing; and the provision of a form of headlight which is particularly adapted for use in connection with vacuum cleaners employing a detachable nozzle which may be removed for connecting attachment tools to the suction inlet of the cleaner.

With these and other objects in view, the invention consists in the novel construction, arrangement and combination of parts, hereinafter illustrated and described in some of its embodiments in the accompanying drawings, and particularly pointed out in the appended claims.

In the drawings, Figure 1 is a side elevational view, partly in section, of a vacuum cleaner illustrating one form of the invention; Figure 2 is an enlarged detail sectional view taken on line 2—2, Figure 1; Figure 3 is an enlarged detail sectional view taken on line 3—3, Figure 1; Figure 4 is a side elevational view, partly in section, illustrating a modified form of vacuum cleaner headlight adapted particularly for use in connection with vacuum cleaners employing a detachable nozzle; Figure 5 is a side elevational view, partly in section, of another modification of cleaner headlight adapted for use in connection with vacuum cleaners employing a detachable nozzle; Figure 6 is a plan view of the underside of the vacuum cleaner shown in Figure 5; and Figure 7 is a side elevational view, partly in section, of yet another modified form of cleaner headlight in which the lamp holder and lamp may be readily removed as a unit from the cleaner casing.

In the form of the invention illustrated in Figures 1 to 3 of the drawings, there is shown a suction cleaner having its operating motor disposed upon a horizontal axis and enclosed within a motor cap 1, forwardly of which there is provided a fan case 2 in communication with a suction nozzle 3, the working mouth of which is indicated at 4. The aforesaid elements constitute the casing of the cleaner and they are supported on casters 5, 5 to facilitate the manipulation of the cleaner.

The fan case 2 is of divided construction including complementary halves located one at each side of the vertical plane through the axis of the motor. The corresponding halves of the fan case are provided with upper and lower corresponding offset flanged parts 6 and 7 for receiving suitable fastening bolts or screws 8 by means of which the two halves of the fan case are secured to each other. A motor driven impeller fan 9 is located within the fan case.

At the top of the casing there is carried a combined lamp support, shade and reflector 10, the forward end of which flares outwardly to form a reflector for a lamp 11 which is detachably secured inside the reflector in a lamp socket 12. The contacts of the lamp socket 12 are connected to electrical conductors 13 which extend over the top of the fan case 2 and then into the motor cap 1 where they are connected to the current supply of the motor of the cleaner.

The combined lamp holder, shade and reflector is provided with a rearwardly extending channeled part 14 beneath which the lamp wires 13 are concealed and protected. This part of the device also serves to cover and conceal the joint extending along the top of the fan case as well as the screws 8, which are used to secure the top of the complementary parts of the fan case to each other and also to secure the lamp shade 10 in its operative position upon the cleaner.

In the modification of the invention illustrated in Figure 4 of the drawings, the cleaner comprises a motor cap 20, a fan case 21 and a suction nozzle 22 having a downwardly extending working mouth 23 forwardly thereof. A fan 25 driven by the motor of the cleaner is located in the fan case 21. The nozzle 22 is detachably secured to the fan case by means of a rotatable locking device 26 having a cam face which engages with a suitable slot 27 formed in an adjacent part of the suction nozzle.

A combined lamp holder, shade and reflector 28 is pivotally secured at 30 to the motor cap 20 of the cleaner casing. A spring fastener 31 cooperating with the head of a rivet 32 is provided to hold this deveice in its operative position which corresponds to the position shown in Figure 4 of the drawings. A suitable socket (not shown) is provided for holding a lamp 33 in position in the reflector and electric cords 34 are provided for connecting the lamp to the current supply circuit of the motor of the cleaner.

By reason of the arrangement just described, when it is intended to use the attachments of the cleaner, the lamp may be swung rearwardly over the motor cap, exposing the nozzle securement means to view, whereupon the nozzle may be readily removed and the various attachments may be fitted in the fan case in place of the nozzle and secured thereto by means of the member 26.

The form of the invention illustrated in Figures 5 and 6 comprises a suction cleaner casing having a motor cap 40, a fan case 41 and a suction nozzle 42 with a downwardly presented working mouth 43. The casing parts just described are carried by supporting wheels 44. The nozzle 42 is detachably secured to the fan case by means of a similar arrangement to that disclosed in connection with Figure 4 of the drawings, including a rotatable locking member 45 having a cam face which cooperates with a suitable slot 46 formed in the exterior part of the nozzle. A combined lamp holder, shade and reflector 47 is integrally formed with the nozzle and it has provisions for reception of a lamp socket 48 in which a lamp 50 is detachably received.

The electrical connections to the lamp socket are by way of lamp cords 51 which are connected to one element 52 of a separable plug connection, the other element 53 of which is carried fixedly with respect to the cleaner fan case. The electrical contacts 49 of the cooperating plug parts are arranged so that upon removal of the nozzle the disconnection to the lamp circuit may be readily and automatically effected and conversely when the nozzle is replaced in its operative position, the electrical circuit of the lamp is automatically re-established.

Suitable conductors 54 lead from the plug part 53 to the interior of the motor cap where they are connected to the current supply circuit of the motor. In addition to the locking means provided by the members 45 and 46 previously described, the nozzle is provided with a pair of notched portions 55, 55 which engage with pins 56, 56 carried by brackets 57, 57 rigid with the fan case to securely hold the lower part of the nozzle in operative relation with respect to the fan case. This same form of construction may be used in connection with the cleaner shown in Figure 4 for assisting in maintaining the nozzle in its proper position with respect to the fan case.

With reference to Figure 7, a lamp 66, fitted in a suitable socket (not shown) and connected to the electrical conductors 67 is carried by the lamp holder. The plug cap 68 of a separable electrical connector is connected to the lamp cords or conductors 67 and it is secured in the rearmost part of the lamp holder. The other element 70 of the plug connector is fixedly attached to the motor casing and the electrical conductors 72 from the plug element 70 are connected in the current supply circuit of the cleaner motor. At the forward end of the lamp holder, a spring clip 71 is provided for detachable engagement with the head of the rivet 32ª as in the form of the invention shown in Figure 4.

By reason of the provisions recited in connection with the lamp holder just described, the lamp and its holder may be removed as a unit from the cleaner and cleaners having the plug connection 70 may be sold with or without the headlight attachment. The removable feature of this device also lends itself to facilitating repairing and servicing of the headlight and the device is also of particular utility when used in connection with cleaners employing a detachable nozzle.

The rearwardly extending part of the lamp holder shown in Figures 4 and 7 corresponds substantially to the rearwardly extending part of the lamp holder shown in Figures 1 to 3 of the drawings. The invention, however, is not limited to the specific form of the channeled member as this part of the device may assume a variety of shapes and still perform the functions of concealing the lamp cord as well as concealing certain portions of the casing.

The modification of the invention shown in Figure 7 corresponds substantially to the construction used in connection with the device illustrated in Figure 4, differing therefrom in that the pivotal connection of the lamp holder is replaced by a separable plug connector. By reason of this arrangement, the lamp and its holder may be bodily removed from the cleaner casing which comprises a motor housing 60, a fan case 61 and a removable suction nozzle 62. An impeller fan 61ª driven by the motor of the cleaner is housed within the fan casing. Detachable fastening means 61ᵇ, similar to those shown in connection with Figure 4, may be provided for the removable nozzle 62 of the cleaner casing, although the lamp holder disclosed in this form of the invention would be useful in connection with cleaners of the type in which the nozzle is a fixed part of the cleaner casing.

One of the advantageous features of the form of invention illustrated in Figure 7 is that of providing a headlight which may be furnished or sold optionally as a part of the cleaner or as an attachment therefor as the headlight shown may be supplied as a part of the cleaner or left off of same without difficulty. This feature is made possible by removably associating with the cleaner casing a combined lamp holder, shade and reflector 64 having a rearwardly extending, cord concealing part 65.

Furthermore, it is to be understood that the particular forms of suction cleaner headlight shown and described, and the particular procedure set forth are presented for purposes of illustration and explanation and that various modifications of said apparatus and procedure may be made without departure from the invention as defined in the appended claims.

Having thus described my invention, what I claim is:

1. In a suction cleaner, a casing structure comprising a suction nozzle, a fan case and a motor housing, means for detachably securing said nozzle to said fan case, a lamp holder pivotally secured to said motor housing and extending over the suction nozzle whereby the lamp holder may be swung away from its operative position over the nozzle at the will of the operator, and a manually operable locking device located beneath said lamp holder when the lamp holder is in its operative position and exposed for manipulation when said lamp holder is moved to its inoperative position.

2. In a suction cleaner, a casing structure comprising a suction nozzle, a fan case and a motor housing, means for detachably securing said nozzle to said fan case, including a manually operable nozzle locking device located at the top of the nozzle and adjacent to the fan case, and a lamp holder secured to said casing above said locking device in concealing relation and displaceable from such position to permit access to said locking device when it is desired to remove the suction nozzle.

GEORGE H. SCOTT.